United States Patent
Mao et al.

(10) Patent No.: US 9,284,397 B2
(45) Date of Patent: Mar. 15, 2016

(54) CURABLE AQUEOUS COMPOSITION

(75) Inventors: Zhiqiang Mao, Shanghai (CN); Miao Yang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 516 days.

(21) Appl. No.: 12/958,848

(22) Filed: Dec. 2, 2010

(65) Prior Publication Data

US 2011/0152447 A1  Jun. 23, 2011

(30) Foreign Application Priority Data

Dec. 18, 2009 (CN) .......................... 2009 1 0261573

(51) Int. Cl.
*C08L 33/02* (2006.01)
*C08F 222/02* (2006.01)

(52) U.S. Cl.
CPC .................................... *C08F 222/02* (2013.01)

(58) Field of Classification Search
CPC .............................. C08F 222/02; C08F 222/06
USPC ....................................................... 524/559
See application file for complete search history.

(56) References Cited

U.S. PATENT DOCUMENTS

| 4,083,835 | A | | 4/1978 | Pohlemann et al. |
| 4,101,602 | A | | 7/1978 | Fabris et al. |
| 4,256,809 | A | * | 3/1981 | Larsson et al. ................. 428/473 |
| 4,769,410 | A | | 9/1988 | Blum et al. |
| 4,952,623 | A | | 8/1990 | Auchter et al. |
| 5,153,274 | A | | 10/1992 | Kinloch et al. |
| 5,432,229 | A | | 7/1995 | Aoki et al. |
| 5,451,432 | A | * | 9/1995 | Lofton ........................ 427/389.9 |
| 5,817,712 | A | | 10/1998 | Weinberger et al. |
| 6,136,916 | A | * | 10/2000 | Arkens et al. ................. 524/556 |
| 2002/0103278 | A1 | | 8/2002 | Krajnik et al. |
| 2005/0107527 | A1 | | 5/2005 | Holub et al. |

FOREIGN PATENT DOCUMENTS

| EP | 0618238 | 10/1994 |
| EP | 1298152 | 4/2003 |
| JP | 2000309743 | 11/2000 |
| JP | 2004339424 | 12/2004 |

* cited by examiner

*Primary Examiner* — David W Wu
*Assistant Examiner* — Marie Reddick
(74) *Attorney, Agent, or Firm* — Andrew E. C. Merriam

(57) ABSTRACT

A curable aqueous composition, a method for forming a treated substrate with the curable aqueous composition, and the substrate so treated are provided. The composition, the method and the treated substrate may be free from formaldehyde. The composition comprises a (co)polymer and a crosslinker, said (co)polymer comprising, as (co)polymerized units, from 0.05 to 10 wt %, based on the dry weight of the composition, ethylenically unsaturated monomer having at least two carboxylic acid groups, wherein the crosslinker having at least two hydrazino groups having a molar ratio of at least 0.05 of the carboxylic acid group, and wherein the aqueous composition is curable at a temperature of from 100° C. to 250° C.

9 Claims, No Drawings

CURABLE AQUEOUS COMPOSITION

This patent application claims the benefit of the earlier filed Chinese Patent Application No. 200910261573.9 filed on Dec. 18, 2009 under 37 CFR 1.55(a).

BACKGROUND

This invention relates to a curable aqueous composition, a method for forming a treated flexible substrate using the curable aqueous composition, and the substrate so treated.

Flexible substrates such as paper, woven fabrics and nonwoven fabrics are frequently consolidated or strengthened by treating with a polymeric binder to dispose in or on the substrate. The tensile strength of treated substrate in the status of dry, water immersed (wet) and isopropyl alcohol immersed (IPA) is one of the most important properties to reflect the quality of binder. When a binder treated substrate has high dry, wet and IPA tensile strength, it usually has improved properties including resiliency, crack resistance, dryclean resistance, wash durability, tear strength and fold endurance.

In many instances, the binder is present in a substantially thermoplastic, or substantially uncrosslinked state so that flow, penetration, film formation and the like may occur after the binder solution or dispersion has contacted the substrate. In order to enhance the properties of the treated substrate, it is frequently desirable to effect crosslinking once the binder has achieved its final location, or concurrently with the drying process. Many of the conventional crosslinking agents such as, for example, copolymerized N-methylol acrylamide and added urea/formaldehyde resins inherently contain or liberate formaldehyde.

US patent application 2009/0162669 discloses an aqueous dispersion comprising a polymer and a crosslinker, wherein the polymer is a cyclic anhydride-functional polymer and the crosslinker is a multifunctional hydrazine derivative. This composition is curable at 100° C. for 30 minutes, giving a transparent, colorless film with good chemical resistance to acetone. To obtain such anhydride containing aqueous dispersion, an organic solvent (such as acetone) have to be used to disperse the anhydride containing copolymer in water. Besides, the anhydride containing copolymer is usually obtained from water-free polymerization process. An organic solvent free, environment-friendly pathway is still desired.

U.S. Pat. No. 5,385,756 discloses a method for treating a flexible, porous substrate with a water-borne formaldehyde-free composition which comprises a binder comprising copolymerized dicarboxylic acid monomers or their derivatives. The method provides desired benefits while maintaining substantially formaldehyde-free compositions and processes employing them. However, a fixed base is required prior to treating the porous substrate to partially neutralize with the composition. In order to simplify the application, a one package binder system with efficiently self-curing property is desired.

The problem addressed by this invention is to overcome above defects in the art by providing a curable aqueous composition prepared by an organic solvent free pathway for the treating of flexible or nonwoven substrates with improved processability and acceptable performance.

Statement of Invention

In a first aspect of the present invention, there is provided a curable aqueous composition comprising a (co)polymer and a crosslinker, said (co)polymer comprising, as (co)polymerized units, from 0.05 to 10% by weight, based on the dry weight of the composition, ethylenically unsaturated monomer having at least two carboxylic acid groups, wherein the crosslinker has at least two hydrazino groups, wherein the molar ratio of the hydrazino group in the crosslinker to the carboxylic acid group in the composition is at least 0.05; and wherein the composition is curable at a temperature of from 100° C. to 250° C.

In a second aspect of the present invention, there is provided a method for forming a treated substrate comprising the steps of:

1) forming a curable aqueous composition of the first aspect of the present invention;

2) contacting a flexible substrate with the aqueous composition; and 3) heating the aqueous composition at a temperature of from 100° C. to 250° C. to cure the composition.

In a third aspect of the present invention, there is provided a treated substrate formed by the method of the second aspect of the present invention.

DETAILED DESCRIPTION

For the purpose of describing the components in the compositions of this invention, all phrases comprising parenthesis denote either or both of the included parenthetical matter and its absence. For example, the phrase "(co)polymer" includes, in the alternative, polymer, copolymer and mixtures thereof; and the phrase "(meth)acrylate" means acrylate, methacrylate, and/or mixtures thereof.

The curable aqueous composition of the present invention comprises a (co)polymer or a cold blend of (co)polymer. The phrase "curable" herein is meant capable of a structural or morphological change which is sufficient to alter the properties of a flexible substrate to which an effective amount of polymeric binder has been applied such as, for example, covalent chemical reaction, ionic interaction or clustering, improved adhesion to the substrate, phase transformation or inversion, hydrogen bonding, and the like. The (co)polymer herein is a (co)polymer prepared by the addition polymerization of ethylenically-unsaturated monomers in an aqueous emulsion or solution polymerization process; the cold blend of (co)polymer herein is the mixture of two or more emulsion or solution (co)polymer. By "aqueous composition" herein is meant a composition in which the continuous phase is water or a mixture including predominantly water but also including water-miscible solvent. A "curable composition" herein is one that undergoes a chemical process to some extent such as covalent bond formation under the agency of added energy, most typically heating.

The (co)polymer comprises, as (co)polymerized units, from 0.05 to 10% by weight, preferably from 2 to 6% by weight, based on the dry weight of the aqueous composition, ethylenically unsaturated acidic monomer having at least two carboxylic acid groups such as, for example, itaconic acid, fumaric acid, maleic acid, including their salts, and mixtures thereof. Preferred is itaconic acid.

The (co)polymer may optionally comprises, up to 99.95% by weight, preferably from 75% to 98% by weight, more preferably from 90% to 98% by weight, based on the dry weight of the (co)polymer, one or more other copolymerized ethylenically unsaturated monomer(s) such as, for example, a (meth)acrylic ester monomer including methyl (meth)acrylate, ethyl (meth)acrylate, butyl(meth)acrylate, 2-ethylhexyl (meth)acrylate, decyl(meth)acrylate, hydroxyethyl(meth) acrylate, hydroxypropyl(meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; and (meth)acrylonitrile. Preferably, monomers which may generate formaldehyde on polymerization or during subsequent processing such as, for example, N-alkylol(meth)acrylamide are excluded.

In certain embodiments, the (co)polymer comprises from 0 to 5 wt %, preferably from 0 to 2 wt %, further preferably from 0 to 1 wt %, based on the dry weight of the (co)polymer, a copolymerized multi-ethylenically unsaturated monomer. The multi-ethylenically unsaturated monomer includes, for example, allyl(meth)acrylate, diallyl phthalate, 1,4-butylene glycol di(meth)acrylate, 1,2-ethylene glycol di(meth)acrylate, 1,6-hexanediol di(meth)acrylate and divinyl benzene.

In one embodiment of the present invention, the (co)polymer is a homopolymer of dicarboxylic acid monomers which having two carboxylic acid groups such as, for example, itaconic acid, fumaric acid, maleic acid, including their salts, and mixtures thereof. Preferred is maleic acid and itaconic acid. The amount of the homopolymer ranges from 0.05 to 10% by weight, preferably from 2 to 6% by weight, based on the dry weight of the aqueous composition.

The aqueous composition comprising at least two different (co)polymers are also contemplated. For a mixture of two or more emulsion or solution polymers, the content of the (co)polymerized dicarboxylic acid monomer shall be determined from the overall composition of the (co)polymers without regard for the number of (co)polymers therein. Preferably soft binder and hard binder are mixed to adjust the handle of the treated substrate.

The emulsion or solution polymerization techniques used to prepare the aqueous emulsion or solution (co)polymer are well known in the art such as, for example, as disclosed in U.S. Pat. Nos. 4,325,856; 4,654,397; 5,314,943 and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to adjust the molecular weight of the (co)polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

In another embodiment, the aqueous emulsion (co)polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. Each of the stages of the multi-staged emulsion polymer may contain monomers, surfactants, chain transfer agents, etc. selected from those disclosed herein-above for the emulsion polymer. For a multi-staged emulsion polymer, the copolymerized dicarboxylic acid monomer content shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The glass transition temperature (Tg) of the (co)polymer is from −65° C. to 150° C., preferably from −55° C. to 65° C., and more preferably from −35° C. to 40° C. Tgs of the polymers herein are those calculated using the Fox equation (T. G. Fox, *Bull. Am. Physics Soc.*, Volume 1, Issue No. 3, page 123(1956)). That is, for calculating the Tg of a copolymer of monomers M1 and M2, $$1/Tg(calc.)=w(M1)/Tg(M1)+w(M2)/Tg(M2),$$

wherein:
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of the homopolymers may be found, for example, in "Polymer Handbook", edited by J. Brandrup and E. H. Immergut, Interscience Publishers.

The average particle diameter of the (co)polymer particles is typically from 30 nanometers to 500 nanometers, preferably from 60 nanometers to 150 nanometers as measured by a Brookhaven Model BI-90 Particle Sizer supplied by Brookhaven Instrument Corp., Holtsville, N.Y.

The curable aqueous composition of the present invention comprises a crosslinker, wherein the molar ratio of the hydrazino group in the crosslinker to the carboxylic acid group in the aqueous composition is at least 0.05, preferably from 0.05 to 2, more preferably from 0.1 to 1. By "crosslinker" herein is meant a molecule having at least two hydrazino groups. The crosslinker may be a compound with a molecular weight less than 1000 bearing at least two hydrazino groups such as, for example, dicarboxylic dihydrazides containing between 2 and 10 carbon atoms, in particular between 4 and 6 carbon atoms. Example of the crosslinker is such as, for example, oxalic dihydrazide, malonic dihydrazide, succinic dihydrazide, glutaric dihydrazide, adipic dihydrazide (ADH), sebacinic dihydrazide (SBDH), phthalic dihydrazide, isophthalic dihydrazide, terephthalic dihydrazide, maleic dihydrazide (MDH), fumaric dihydrazide and itaconic dihydrazide. It is also contemplated to use multifunctional hydrazine derivates containing three or more hydrazide groups, such as citric trihydrazide, nitriloacetic trihydrazide, cyclohexanoic tricarboxylic trihydrazide, and ethylene diamine tetra-acetic tetrahydrazide. Preferably, the multifunctional hydrazine derivative is chosen from the group comprising adipic dihydrazide, succinic dihydrazide and sebacinic dihydrazide.

In certain embodiments, the curable aqueous composition comprises a phosphorus-containing species which can be a phosphorus-containing compound such as, for example, an alkali metal hypophosphite salt, an alkali metal phosphite, an alkali metal polyphosphate, an alkali metal dihydrogen phosphate, a polyphosphoric acid, and an alkyl phosphinic acid or it can be an oligomer or polymer bearing phosphorus-containing groups such as, for example, an addition polymer of acrylic and/or maleic acid formed in the presence of sodium hypophosphite, addition polymers such as, for example, a polymer prepared from ethylenically unsaturated monomers in the presence of phosphorus salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. In certain embodiments, the phosphorus-containing species is used at a level of from 0% to 40%, preferably from 0% to 5%, further preferably from 0% to 2.5%, more preferably from 0% to 1%, by weight based on the dry weight of the polymer of the present invention.

The curable aqueous composition of the present invention is preferably a formaldehyde-free curable composition. By "formaldehyde-free composition" herein is meant that the composition is substantially free from formaldehyde, nor does it liberate substantial formaldehyde as a result of drying and/or curing. In order to minimize the formaldehyde content of the curable composition it is preferred, when preparing the emulsion polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. When low levels of formaldehyde are acceptable in the waterborne composition or when compelling reasons exist for using adjuncts which generate or emit formaldehyde, such compositions can be used.

The curable aqueous composition may contain, in addition, conventional treatment components such as, for example, emulsifiers, pigments, fillers or extenders, anti-migration aids, curing agents, coalescents, surfactants, biocides, plasticizers, organosilanes, anti-foaming agents, corrosion inhibitors, colorants, waxes, other polymers not of the present invention, and anti-oxidants.

In another aspect of the present invention, a method for forming a treated substrate is provided comprising the steps of: a) forming the curable aqueous composition of the present invention; b) contacting a flexible substrate with the curable aqueous composition; and c) heating the curable aqueous composition at a temperature of from 100° C. to 250° C.

The flexible substrate includes paper; leather; woven or nonwoven fabrics; felts and mats or other assemblies of fibers, and fibers. Substrates including fibers may include cotton, synthetic fibers such as, for example, polyester and rayon, glass, mixtures thereof, and the like.

The flexible substrate is contacted with the curable aqueous composition using conventional application techniques such as, for example, air or airless spraying, padding, saturating, roll coating, curtain coating, printing, and the like.

The curable aqueous composition is heated at a temperature of from 100° C. to 250° C., preferably from 100° to 200° C., and more preferably from 125° C. to 200° C., for a time sufficient to achieve an acceptable level of cure such as, for example, for a time of from 1 minute to 20 minutes, preferably from 2 minutes to 10 minutes is effected. The drying and curing functions can be effected in two or more distinct steps, if desired. For example, the composition can be first heated at a temperature and for a time sufficient to substantially dry but not to substantially cure the composition and then heated for a second time at a higher temperature and/or for a longer period of time to effect curing. Such a procedure, referred to as "B-staging", can be used to provide binder-treated nonwoven, for example, in roll form, which can at a later stage be cured, with or without forming or molding into a particular configuration, concurrent with the curing process.

In yet another aspect of the present invention, a treated substrate formed by the method of the present invention is provided.

The curable aqueous composition is, as the core of the present invention, curable at the carboxylic acid groups of the monomer having at least two carboxylic acid groups with the hydrazino groups of the crosslinker at a temperature of from 100° C. to 250° C. Such curing process provides an alternative, one package composition for the treatment of flexible substrates.

In the present specification, the technical features in each preferred technical solution and more preferred technical solution can be combined with each other to form new technical solutions unless indicated otherwise. For briefness, the Applicant omits the descriptions for these combinations. However, all the technical solutions obtained by combing these technical features should be deemed as being literally described in the present specification in an explicit manner.

EXAMPLES

I. Raw Materials

Abbreviations used: ADH=adipic dihydrazide; SHP=sodium hypophosphite; IPA=isopropanol; CD=Cross-machine direction; MD=Machine direction; SC=Solid content; EA=Ethyl acrylate; BA=Butyl acrylate; Sty=Styrene; MMA=Methyl methacrylate; IA=Itaconic acid; AA=Acrylic acid; MAA=Methacrylic acid; AN=Acrylonitrile.

AIRFLEXTM™ 192 is a +12° C. Tg self-crosslinking emulsion copolymer commercially available from Air Products and Chemicals, Inc.

WHATMAN™ #4 paper is a product of Whatman Ltd.

Polyester nonwoven (30 g/m², spunbond and non-treated)

II. Test Methods

A piece of WHATMAN™ paper or polyester nonwoven (28 cm×46 cm) was dipped into 200 mL curable aqueous composition. The treated substrate was padded by Mathis padder and then dried and cured at 150° C. for 3 minutes. The cured substrate was cut into pieces of 1 inch×5 inch. The tensile strength of specimens was tested under the treatment of dry (untreated), wet (after 30 minutes immersion in 0.1% Triton X-100/water solution) and "IPA" (after 30 minutes immersion in isopropanol).

Example 1

An emulsion copolymer (denoted as E1) including 5% IA, 76% EA and 19% Sty by weight based on the dry weight of the copolymer, was prepared according to the teachings of Example 1 of U.S. Pat. No. 5,451,432.

Above emulsion copolymer was formulated with ADH and SHP to obtain a curable aqueous composition (Comp. A). A commercial product AIRFLEX™ 192, denoted as CK, was used as control.

A saturated cellulosic substrate and a saturated polyester substrate were evaluated for water and solvent resistance. The data of Comp. A and CK are shown in Table 2 and Table 3.

TABLE 1

Formulation of Comp. A and CK

| Unit: grams | CK | Comp. A |
|---|---|---|
| SC | 50% | 45% |
| AIRFLEX ™ 192 | 200 | 0 |
| E1 | 0 | 200 |
| ADH | 0 | 3.1 |
| SHP | 0 | 2 |
| Water | 200 | 175.3 |

TABLE 2

Evaluation of tensile strength of cured aqueous composition saturated on a paper substrate

| Tensile Strength (kgf/inch) | CK | Comp. A |
|---|---|---|
| Dry (CD) | 10.4 | 10.3 |
| Wet (CD) | 5.1 | 4.9 |
| IPA (CD) | 2.7 | 2.8 |

TABLE 3

Evaluation of tensile strength of cured aqueous composition saturated on a polyester substrate

| Tensile Strength (kgf/inch) | | CK | Comp. A |
|---|---|---|---|
| CD | Dry | 2.1 | 2.1 |
| | Wet | 1.8 | 1.6 |
| | IPA | 0.8 | 0.6 |
| MD | Dry | 4.8 | 4.5 |
| | Wet | 4.5 | 4.4 |
| | IPA | 3.2 | 2.1 |

Comp. A showed comparable dry and wet tensile performance to the CK both on natural substrate and synthetic substrate. The IPA strength of Comp. A was a little lower than the CK. In most of the textile and nonwoven applications such as wet wipes and pigment printing, solvent resistance has lower priority than water resistance. So the final performance of those two binders is comparable.

Example 2

An emulsion copolymer (denoted as E2) including 1% AA, 4% IA, 76% EA and 19% Sty by weight based on the dry weight of the copolymer, was prepared and was then formulated with ADH and SHP to obtain a curable aqueous composition (Comp. B) by using the same method of Example 1.

A saturated cellulosic substrate was evaluated for water and solvent resistance. The data of Comp. B are shown in Table 5.

TABLE 4

Formulation of Comp. B

| Unit: grams | CK | Comp. B |
|---|---|---|
| SC | 50% | 45% |
| AIRFLEX ™ 192 | 200 | 0 |
| E2 | 0 | 200 |
| ADH | 0 | 2.5 |
| SHP | 0 | 2 |
| Water | 200 | 173.4 |

TABLE 5

Evaluation of tensile strength of cured aqueous composition saturated on a paper substrate

| Tensile Strength (kgf/inch) | CK | Comp. B |
|---|---|---|
| Wet (CD) | 4.8 | 4.4 |
| IPA (CD) | 2.7 | 2.5 |

Comp. B showed comparable wet and IPA tensile performance to CK on paper substrate.

Examples 3 to 5

Same as Example 1 except the emulsion copolymer (denoted as E3~E5) consisted of copolymerized monomers, by weight based on the dry weight of the copolymer:

E3: 1% IA, 2% MAA, 78.1% BA and 18.9% AN

E4: 2.5% IA, 87.1% EA and 10.4% MMA

E5: 6% IA, 76% EA and 18% Sty

Then E3~E5 were respectively formulated with ADH and SHP to obtain Comp. C to Comp. E (Formulation see Table 6).

Example 6

A solution copolymer (denoted as S1) including 25% IA and 75% AA by weight based on the dry weight of the (co)polymer, was prepared according to the teachings of Example 1 of U.S. Pat. No. 5,314,943. S1 was formulated with E5, ADH and SHP to obtain Comp. F. (Formulation see Table 6).

TABLE 6

Formulation of Comp. C to F

| Unit: grams | Comp. C | Comp. D | Comp. E | Comp. F |
|---|---|---|---|---|
| E3 (SC: 45%) | 200 | 0 | 0 | 0 |
| E4 (SC: 45%) | 0 | 200 | 0 | 0 |
| E5 (SC: 45%) | 0 | 0 | 200 | 150 |
| S1 (SC: 28%) | 0 | 0 | 0 | 64.3 |
| ADH | 0.6 | 1.5 | 3.7 | 5.9 |
| SHP | 2 | 2 | 2 | 2 |
| Water | 167.9 | 170.6 | 177.2 | 79.4 |

TABLE 7

Evaluation of tensile strength of cured aqueous composition saturated on a paper substrate

| Tensile Strength (kgf/inch) | Comp. C | Comp. D | Comp. B | Comp. A | Comp. E | Comp. F |
|---|---|---|---|---|---|---|
| IA content (%)* | 1 | 2.5 | 4 | 5 | 6 | 10 |
| Wet (CD) | 2.3 | 3.2 | 4.4 | 4.9 | 4.6 | 4.0 |
| IPA (CD) | 2.0 | 2.5 | 2.5 | 2.8 | 2.8 | 3.2 |

*All the IA contents in the examples were given by weight percentage, based on the dry weight of the aqueous composition.

When IA content was from 4% to 6% by weight, based on the dry weight of the aqueous composition, the binder showed very good wet and IPA strength on nonwoven substrate. The performance was comparable to traditional binders in textile and nonwoven applications. When IA content was lower than 4% or higher than 6%, the performance was a little lower but it was still acceptable for some certain lower requirement applications.

Examples 7 to 14

Same as Example 1 except the emulsion copolymer (denoted as E6) consisted of 5% IA and 95% EA by weight based on the dry weight of the (co)polymer. E6 was formulated with ADH and SHP to obtain Comp. G to Comp. N. (Formulation see Table 8)

TABLE 8

Formulation of Comp. G to N

| Unit: grams | Comp. G | Comp. H | Comp. I | Comp. J | Comp. K | Comp. L | Comp. M | Comp. N |
|---|---|---|---|---|---|---|---|---|
| E6 (SC: 35%) | 200 | 200 | 200 | 200 | 200 | 200 | 200 | 200 |
| $Mol_{ADH}/Mol_{IA}$ | 0.05 | 0.11 | 0.21 | 0.43 | 0.64 | 0.85 | 1.06 | 2 |
| ADH | 0.25 | 0.5 | 1.0 | 2.1 | 3.1 | 4.1 | 5.1 | 9.6 |
| Water | 81.6 | 81.6 | 83 | 86.2 | 89.3 | 92.3 | 95.3 | 108.9 |

TABLE 9

Evaluation of tensile strength of cured aqueous composition saturated on a paper substrate

| Tensile Strength (kgf/inch) | Comp. G | Comp. H | Comp. I | Comp. J | Comp. K | Comp. L | Comp. M | Comp. N |
|---|---|---|---|---|---|---|---|---|
| $MOL_{ADH}/Mol_{IA}$ | 0.05 | 0.11 | 0.21 | 0.43 | 0.64 | 0.85 | 1.06 | 2 |
| Wet (CD) | 4.0 | 4.1 | 4.0 | 4.1 | 3.9 | 4.0 | 3.8 | 3.8 |
| IPA (CD) | 2.3 | 3.0 | 3.5 | 4.0 | 4.2 | 4.3 | 4.2 | 3.8 |

When the molar ratio of the hydrazino group to the carboxylic acid group increased from 0.05 to 2, the wet and IPA tensile performance firstly increased and then slightly decreased. Though Comp. G gave relatively low IPA strength, the wet strength was also very good. In certain applications such as wipes, this performance is acceptable.

Examples 15 and 16

Same as Example 1 except the E6 was formulated with ADH in and without the presence of SHP. (Formulation see Table 10). The resulting aqueous compositions were denoted as Comp. O and P.

TABLE 10

Formulation of Comp. O and P

| Unit: grams | Comp. O | Comp. P |
|---|---|---|
| E6 (SC: 35%) | 200 | 200 |
| ADH | 2.4 | 2.4 |
| SHP | 2 | 0 |
| Water | 93.2 | 87.2 |

TABLE 11

Evaluation of tensile strength of cured aqueous composition saturated on a paper substrate

| Tensile Strength (kgf/inch) | Comp. O | Comp. P |
|---|---|---|
| Wet (CD) | 3.8 | 4.1 |
| IPA (CD) | 4.2 | 4.0 |

When SHP was formulated in the binders, the wet strength slightly decreased while the IPA strength slightly increased. SHP can be formulated in the aqueous composition if solvent resistance performance (such as dry-cleaning resistance) is required.

Examples 17 to 19

When curable composition was cured, new covalent bonds were formed between polymer and cross-linker. The modulus of the dried film obtained from aqueous curable composition significant increased at crosslinking temperature. The modulus of the dried polymer composition versus heating temperature was monitored by Dynamic Mechanical Analysis (DMA) method.

The dried film was obtained by drying the aqueous curable composition at RT for 1 week. The film was cut into disc-like pieces with a diameter of 5.5 mm and a thickness of 2~3 mm. The disc-like film was tested using a TA AR2000ex instrument. The starting point ($T_{onset}$), mid-point ($T_x$) and end point ($T_{final}$) of the crosslinking temperature are given in Table 13.

TABLE 12

Formulation of Comp. Q to S

| Unit: grams | Comp. Q | Comp. R | Comp. S |
|---|---|---|---|
| E6 (SC: 35%) | 200 | 200 | 200 |
| ADH | 0 | 2.4 | 2.4 |
| SHP | 0 | 0 | 2 |
| Water | 80 | 87.2 | 93.2 |

TABLE 13

Crosslinking temperature of IA/ADH

| | $T_{onset}$* | $T_x$* | $T_{final}$* |
|---|---|---|---|
| Comp. Q | 200 | 212 | 224 |
| Comp. R | 125 | 151 | 174 |
| Comp. S | 100 | 128 | 140 |

*$T_{onset}$: Temperature that the crosslinking starts.
$T_x$: Temperature that the fastest crosslinking occurs.
$T_{final}$: Temperature that the crosslinking completes.

The curing (ie. IA/ADH crosslinking) process was related with curing temperature and curing time. The higher temperature the shorter curing time needed. The performance had limited difference when curing at temperature higher than $T_{onset}$ if optimized curing time was applied.

What is claimed is:

1. A curable aqueous composition comprising a (co)polymer and a crosslinker, said (co)polymer comprising, as (co)polymerized units,
  from 0.05 to 10% by weight, based on the dry weight of the (co)polymer, of ethylenically unsaturated monomer having at least two carboxylic acid groups ("monomer a)"),
  wherein the crosslinker has at least two hydrazino groups, wherein the molar ratio of the hydrazino group in the crosslinker to the carboxylic acid group in the composition is at least 0.05:1; and
  wherein the composition is curable at a temperature of from 100° C. to 250° C.

2. The curable aqueous composition of claim 1, wherein the monomer a) is a dicarboxylic acid.

3. The curable aqueous composition of claim 2, wherein the dicarboxylic acid is selected from the group consisting of itaconic acid, fumaric acid, maleic acid, salts thereof, and mixtures thereof.

4. The curable aqueous composition of claim 1, wherein the crosslinker is a hydrazide derivative having at least two hydrazide groups.

5. The curable aqueous composition of claim 1, wherein the composition is curable at the carboxylic acid groups of the monomer a) with the hydrazino groups of the crosslinker at a temperature of from 100° C. to 200° C.

6. The curable aqueous composition of claim 1, wherein the molar ratio of the hydrazino group in the crosslinker to the carboxylic acid group in the composition is from 0.1:1 to 1:1.

7. The curable aqueous composition of claim 1, wherein the composition further comprises a phosphorous-containing accelerator.

8. A curable composition comprising a (co)polymer and a crosslinker, said (co)polymer comprising, as (co)polymerized units,
  from 0.05 to 10% by weight, based on the dry weight of the co)polymer, of ethlyenically unsaturated monomer having at least two carboxylic acid groups ("monomer a)"),
  wherein the crosslinker has at least two hydrazino groups, wherein the molar ratio of the hydrazino group in the crosslinker to the carboxylic acid group in the composition is at least 0.05:1; and
  wherein the composition is curable at a temperature of from 100° C. to 250° C.; and wherein the composition further comprises a phosphorous-containing accelerator.

9. The composition of claim 8 wherein the phosphorus-containing accelerator is selected from the group consisting of alkali metal hypophosphite salt, alkali metal phosphite, alkali metal polyphosphate, alkali metal dihydrogen phosphate, polyphosphoric acid, alkyl phosphinic acid, an oligomer or polymer bearing phosphorous-containing groups, and combinations thereof.

* * * * *